United States Patent

Komura et al.

[11] Patent Number: 4,740,060
[45] Date of Patent: Apr. 26, 1988

[54] ELECTRO-OPTICAL DEVICE HAVING HEAT-BONDABLE AND NON-HEAT-BONDABLE GAP CONTROLLERS

[75] Inventors: Akihiko Komura, Hiratsuka; Yoshio Hotta, Atsugi; Fumiko Hashizume, Sagamihara, all of Japan

[73] Assignee: Canon Kabushiki Kaisha, Tokyo, Japan

[21] Appl. No.: 942,212

[22] Filed: Dec. 16, 1986

[30] Foreign Application Priority Data

Dec. 24, 1985 [JP] Japan ................................ 60-289490

[51] Int. Cl.$^4$ ................................................. G02F 1/13
[52] U.S. Cl. .................................. 350/344; 350/350 S
[58] Field of Search ............................ 350/344, 350 S

[56] References Cited

U.S. PATENT DOCUMENTS 4,362,771 12/1982 Umeda et al. .................. 350/344 X
4,634,226 1/1987 Isogai et al. ................ 350/350 S X Primary Examiner—Stanley D. Miller
Assistant Examiner—Richard Gallivan
Attorney, Agent, or Firm—Fitzpatrick, Cella, Harper & Scinto

[57] ABSTRACT

An improvement in an electro-optical device, such as a liquid-crystal panel, having a pair of substrates and an optical modulating substance disposed between the substrates, comprising hard gap controllers of a material which cannot be heat-bonded to the substrates and soft gap controllers of a material heat-bondable to the substrates being mutually dispersed in the optical modulating substance between the substrates. These gap controllers effectively prevent distortion of the cell and eliminate degradation of the display quality which may otherwise be caused due to generation of interference color.

19 Claims, 1 Drawing Sheet

ELECTRO-OPTICAL DEVICE HAVING HEAT-BONDABLE AND NON-HEAT-BONDABLE GAP CONTROLLERS

BACKGROUND OF THE INVENTION

1. Field of the Invention

The present invention relates to an electro-optical device and, more particularly, to an electro-optical device which makes use of a liquid crystal as an optical modulating substance.

2. Description of the Prior Art

In general, unevenness in the gap between an upper substrate and a lower substrate of an electro-optical device seriously impairs the display performance of the device, because of the generation of interference colors. In order to avoid this problem, it has been proposed to disperse spherical or fibrous gap-controlling substances between the upper and lower substrates so as to make the gap between these substrates uniform. An electro-optical device having such gap-controlling substances is disclosed in U.S. Pat. No. 4,050,786.

This type of electro-optical device, however, suffers from the following disadvantage, particularly when it is used in a flexible panel or similar article which employs flexible substrates such as those made of plastic films, glass sheets of an extremely small thickness, e.g. 0.3 mm or less, or other sheet-like material which has a large surface area compared to its thickness. In such a panel, the liquid-crystal molecules placed between the substrates are often disordered or oscillated as a result of local distortion of the panel caused by, for example, pressure applied to the panel. This results in the quality of the display on the panel becoming seriously degraded due to optical modulation which takes place over a wide area around the pressed portion of the panel.

SUMMARY OF THE INVENTION

Accordingly, an object of the present invention is to provide an electro-optical device which is capable of eliminating any distortion of an electro-optical panel caused by an external force, and the consequent oscillation of the liquid-crystal molecules, thereby assuring a high quality display.

To this end, according to one aspect of the present invention, there is provided in an electro-optical device comprising an optical modulating substance interposed in a region between a pair of substrates, the improvement comprising first gap controllers of a heat-bondable substance and second gap controllers of a non-heat-bondable substance, said first and second gap controllers being mutually dispersed within the optical modulating substance in the region between the substrates.

According to another aspect of the present invention, there is provided in an electro-optical device comprising a pair of substrates and an optical modulating substance interposed in a region between the substrates, the improvement comprising at least first gap controllers and second gap controllers disposed in the region between the substrates, wherein the first gap controllers are bonded to both substrates and the second gap controllers are in non-bonding contact with both the substrates.

The above and other objects, features and advantages of the invention will become clear from the following description of the preferred embodiments taken in conjunction with the accompanying drawing.

BRIEF DESCRIPTION OF THE DRAWING

The attached sole

DESCRIPTION OF THE PREFERRED EMBODIMENTS

Figure 1:
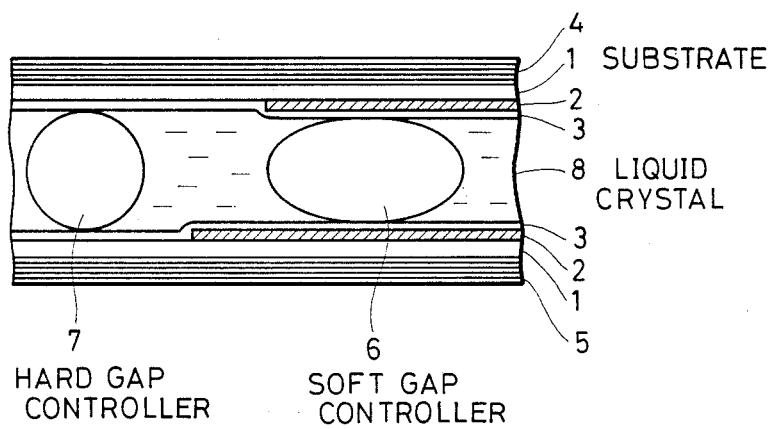
FIG. 1 is a sectional view of a flexible liquid-crystal cell of an electro-optical device in accordance with the present invention.

Referring to the drawing, an embodiment of the invention is described which is a flexible liquid-crystal cell having upper and lower flexible substrates 1, transparent conductive films 2, orientation films 3, and polarizing plates 4 and 5. A layer of liquid-crystal 8 is provided between the upper and lower orientation films 3. The layer of the liquid-crystal 8 contains soft gap controllers 6 made of a heat-bondable material and hard gap controllers 7 made of a non-heat-bondable material.

Each of the flexible substrates 1 may be made of a plastic film or a glass sheet having a thickness of 0.3 mm or less. The transparent conductive film 2 formed on each flexible substrate 1 constitutes an electrode. This film 2 may be made of an ITO (Indium-Tin Oxide). The orientation film 3 formed on each transparent conductive film 2 may be a film of a polyimide, polyamide or polyvinyl alcohol, which has undergone a uniaxial orientation treatment such as rubbing. Alternatively, each orientation film 3 may be made of an SiO or $SiO_2$ film formed by oblique evaporation. The liquid crystal 8 may be a twisted nematic liquid crystal, nematic-cholesteric phase-shift type liquid crystal, smectic liquid crystal, or a ferroelectric liquid crystal. The polarizing plates 4 and 5 are arranged such that their polarization axes are either orthogonal to, or parallel to, each other. The polarizing plates 4 and 5, however, may be omitted depending on the mode of orientation of the liquid crystal 8.

The soft gap controllers 6 are made of a heat-bondable substance, preferably a heat-bondable resinous material such as polyimide, nylon or epoxy. The soft gap controllers 6 preferably have the form of particles or fibers. When the soft gap controllers 6 are made of a heat-bondable resin, the mean diameter of the particles or fibers of the resin is preferably not greater than twice the mean diameter of the hard gap controllers 7.

According to the invention, the material of the soft gap controllers 6 is selected from the group of materials having softening points not higher than 100° C. The soft gap controllers 6 of such a material, in the form of particles or fibers, can easily be bonded to the substrates 1 when the liquid crystal cell is pressed while being heated to a temperature not higher than 100° C. It is, therefore, possible to prevent deformation of a sealant (not shown) or denaturing of the orientation films 3.

On the other hand, the hard gap controllers 7 are made of a non-heat-bondable material. Practical examples of the hard gap controllers are beads of non-heat-bondable materials such as glass, alumina, silicon oxide and plastics, as well as glass fibers. Preferably, the hard gap controllers 7 have a mean diameter which ranges between 0.1 and 50 μm, more preferably between 1 and 10 μm.

When the upper and lower substrates 1 are pressed towards each other while being heated, the particles or fibers of the soft gap controllers 6 are melted and bonded to these substrates 1. On the other hand, the particles or fibers of the hard gap controllers 7 are not deformed by pressure under application of heat, so that a desired gap, which corresponds to the diameter of the particles or fibers of the hard gap controllers, is maintained between the two substrates. In addition, unintentional movement of the particles or fibers of the hard gap controllers 7 is prevented by the particles or fibers of the soft gap controllers 6 being fixed to the substrates 1.

According to the invention, the ratio $W_1/W_2$ between the total weight $W_1$ of the soft gap controllers 6 and the total weight $W_2$ of the hard gap controllers 7 generally ranges between 0.25 and 4.0, preferably between 0.5 and 2.0. The total concentration of the soft gap controllers 6 and the hard gap controllers 7 dispersed in the layer of the liquid crystal 8 is 10 to 1000 gap controllers/mm$^2$, preferably 20 to 80 gap controllers/mm$^2$.

The improvement in an electro-optical device of the present invention is further explained by the following Examples.

EXAMPLE 1

A pair of substrates made of PET (Polyethylene Terephthalate) were prepared, and transparent electrodes and orientation films (polyether-type acid resin produced by Hitachi Chemical Co., Ltd.) of predetermined shapes were formed on the substrates. The orientation films were subjected to an orientation treatment by rubbing. A sealing frame of a silicone-type sealant was printed on one of the substrates, while a conductive pattern was printed on the other substrate with a conductive paste.

Then, the soft gap controllers and the hard gap controllers were mixed at a weight ratio of 1:1 in an alcohol solution, and were dispersed on the substrate by immersion at a total concentration of about 60 gap controllers/mm$^2$. Thereafter, the two substrates were arranged with respect to each other such that the directions of rubbing on both substrates were orthogonal to each other. The substrates were then uniformly pressed and fired at 120° C. for 1 hour, whereby a cell was formed.

In this example, heat-bondable plastic beads of a mean diameter of 15 $\mu$m, produced and sold by Toray Industries, Inc. under the commercial name of Torebal were used as the soft gap controllers. The setting temperature of these plastic beads was 100° C. On the other hand, alumina beads of 8 $\mu$m in mean diameter were used as the hard gap controllers.

Then, a nematic liquid crystal having a dielectric anisotropy was charged into the cell. In this case, a liquid crystal produced under the commercial name of ZLI 1694 by Merck (West Germany) was used as the above-mentioned liquid crystal. ZLI 1694 is a blend of a first type of liquid crystal such as phenylcyclohexane type, phenylcyclohexane ester type, biphenylcyclohexane type or biphenylcyclohexane ester type and a second type of liquid crystal such as terphenyl type. A liquid crystal panel of twisted nematic type was thus completed.

In order to confirm the advantage of the present invention, a test was conducted with the thus formed liquid-crystal panel and known liquid-crystal panels which employ only non-heat-bondable gap controllers such as glass fibers and plastic beads. In this test, the liquid-crystal panels were locally pressed and the extent of degradation of the display performance due to the application of pressure was examined. The liquid-crystal panel in accordance with the present invention, which employed both the heat-bondable gap controllers and the non-heat-bondable gap controllers, showed no substantial degradation in the display quality, whereas the known liquid-crystal panels showed serious degradation in the display quality.

EXAMPLE 2

Gap controllers of the same types as those used in Example 1 were mixed with a spray gas and were sprayed onto the substrates, so as to be dispersed at the same concentration as in Example 1. Using these substrates, a liquid-crystal panel was formed by the same procedure as in Example 1, except that a hot-melt type sealant was used in place of the silicone-type sealant used in Example 1.

Using this liquid-crystal panel together with known liquid-crystal panels, a test was conducted under the same conditions as in Example 1, the result of which was materially the same as that obtained in Example 1.

It was confirmed also that, by applying the gap controllers simultaneously with the orientation film and causing the gap controllers to attach to one side of the orientation film during curing of the latter, it is possible to prevent the gap controllers from coming off during rubbing and, hence, to simplify the production process.

As has been described, according to the present invention, it is possible to avoid problems such as oscillation of the display image due to oscillation of the liquid-crystal molecules and degradation of the display quality attributable to generation of interference colors, by mutually dispersing the soft and hard gap controllers in the electro-optical cells.

In a preferred form of the present invention, a ferroelectric chiral smectic liquid crystal as disclosed in U.S. Pat. No. 4,367,924 can be used as the liquid crystal. Usually, this type of liquid crystal is set to have a thickness which does not allow formation of a spiral structure peculiar in this type of liquid crystal when no electric field is applied thereto, e.g., 0.5 to 5 $\mu$m. It is known that, when a cell of chiral smectic liquid crystal exhibits a fluctuation in the thickness over the entire area of the device, different domains are formed in the liquid crystal according to the difference in the thickness. To avoid this, it is necessary that the error or deviation of the distance between two substrates from the reference or standard distance be 10% or less. The invention makes it possible to maintain the error or deviation of the distance between two substrates at the required level of 10% or less, by virtue of the presence of the soft gap controllers 6 and the hard gap controllers 7, thus making it possible to form a mono-domain having a wide area and superior bi-stable characteristic.

Although the invention has been described by reference to specific forms, it is to be understood that the described embodiments are only illustrative and various changes and modifications may be imparted thereto without departing from the scope of the invention.

What is claimed is:

1. In an electro-optical device comprising an optical modulating substance interposed in a region between a pair of substrate, the improvement comprising first gap controllers of a heat-bondable substance having a softening point not higher than 100° C. and second gap controllers of a non-heat-bondable substance, said first and second gap controllers being mutually dispersed within the optical modulating substance and in said region between said pair of substrates.

2. An electro-optical device according to claim 1, wherein said first and second gap controllers are dispersed at a total concentration of 10 to 100 gap controllers per millimeter$^2$.

3. An electro-optical device according to claim 1, wherein said first and second gap controllers are dispersed at a total concentration of 20 to 80 gap controllers per millimeter$^2$.

4. An electro-optical device according to claim 1, wherien the value of the ratio $W_1/W_2$ between the total weight $W_1$ of said first gap controllers and the total weight $W_2$ of said second gap controllers is from 0.24 to 4.0.

5. An electro-optical device according to claim 4, wherein the value of said ratio is from 0.5 to 2.0.

6. An electro-optical device according to claim 1, wherein said first gap controllers are in the form of beads or fibers.

7. An electro-optical device according to claim 1, wherein said second gap controllers are in the form of beads or fibers.

8. An electro-optical device according to claim 1, wherein said first gap controlers comprise a heat-bondable resin.

9. An electro-optical device according to claim 8, wherein said heat-bondable resin is selected from the group consisting of polyimide, nylon and epoxy.

10. An electro-optical device according to claim 1, wherein said second gap controllers comprise a non-heat-bondable inorganic material.

11. An electro-optical device according to claim 10, wherein said non-heat-bondable inorganic material is selected from the group consisting of glass, silicon oxide and alumina.

12. An electro-optical device according to claim 1, wherein said optical modulating substance is a liquid crystal.

13. An electro-optical device according to claim 1, wherein at least one of said substrates comprises a plastic film.

14. In an electro-optical device comprising a pair of substrates, an optical modulating substance interposed in a region between said substrates, and an orientation film of polyimide, polyamide or polyvinyl alcohol which has undergone a uniaxial orientation treatment formed on at least one of said pair of substrates, heat-bondable epoxy resinous materials in the form of particles and hard gap controllers disposed in the region between said substrates, wherein said heat-bondable epoxy resinous materials are bonded to both said substrates and said hard gap controllers are in non-bonding contact with both said substrates.

15. An electro-optical device according to claim 14, wherein said hard gap controllers are selected from the group consisting of glass beads, alumina beads, glass fibers and silicon oxide beads.

16. An electro-optical device according to claim 14, wherein said optical modulating substance is a liquid crystal.

17. An electro-optical device according to claim 16, wherein said liquid crystal is a ferroelectric chiral smectic liquid crystal.

18. An electro-optical device according to claim 17, wherein said ferroelectric chiral smectic liquid crystal does not have spiral structure when no electric field is applied thereto.

19. An electro-optical device according to claim 14, wherein at least one of said substrates comprises a plastic film.

* * * * *

UNITED STATES PATENT AND TRADEMARK OFFICE
CERTIFICATE OF CORRECTION

PATENT NO. : 4,740,060
DATED : April 26, 1988
INVENTOR(S) : AKIHIKO KOMURA, ET AL.

It is certified that error appears in the above-identified patent and that said Letters Patent is hereby corrected as shown below:

COLUMN 3

Line 13, "1000" should read --100--.

COLUMN 4

Line 60, "substrate," should read --substrates,--.

COLUMN 5

Line 8, "wherien" should read --wherein--.
Line 11, "0.24" should read --0.25--.
Line 23, "contolers" should read --controllers--.

Signed and Sealed this

Eighth Day of November, 1988

Attest:

DONALD J. QUIGG

*Attesting Officer*  *Commissioner of Patents and Trademarks*